(12) United States Patent
Back et al.

(10) Patent No.: US 6,303,039 B1
(45) Date of Patent: Oct. 16, 2001

(54) METHOD FOR TREATING WATER OVER AN EXTENDED TIME USING TABLETS AND PACKETS

(75) Inventors: Dwight D. Back, Palm City; Robert P. Scaringe, Rockledge; John A. Meyer, Palm Bay, all of FL (US)

(73) Assignee: Mainstream Engineering Corporation, Rockledge, FL (US)

( * ) Notice: Subject to any disclaimer, the term of this patent is extended or adjusted under 35 U.S.C. 154(b) by 0 days.

(21) Appl. No.: 09/520,006

(22) Filed: Mar. 6, 2000

(51) Int. Cl.[7] .................................................... C02F 1/50
(52) U.S. Cl. ............................... 210/764; 210/192
(58) Field of Search ..................................... 210/764, 192

(56) References Cited

U.S. PATENT DOCUMENTS 4,040,515 * 8/1977 Hessel et al. .
4,659,484 * 4/1987 Worley et al. .
5,632,904 * 5/1997 Samad et al. .
5,866,016 * 2/1999 Jaquess et al. .
5,976,364 * 11/1999 Williams .

* cited by examiner

Primary Examiner—Betsey Morrison Hoey
(74) Attorney, Agent, or Firm—Crowell & Moring LLP

(57) ABSTRACT

A method to control microbial growth and other contaminants present in the water of climate control systems includes using tablets or packets to effectively control the growth of microbes such as fungus, molds, bacteria, and virus present in water for an extended period of time. The tablet or packet formulations include at least two metals and at least one chelating agent. Optionally, more soluble salts are also added to the formulations to induce an initial shock of the biologically active compounds in the water followed by a slower release of the less soluble chelating agents and metals.

24 Claims, 2 Drawing Sheets

METHOD FOR TREATING WATER OVER AN EXTENDED TIME USING TABLETS AND PACKETS

BACKGROUND OF THE INVENTION

Air conditioners, heat pumps, dehumidifiers, and humidifiers, can collectively be called climate control systems. Air-conditioners, heat pumps, and dehumidifiers circulate air by a cooled surface. As the warm air is cooled below its dewpoint, water condenses and accumulates on the cooled surface and typically falls into a collection reservoir where eventually the collected water drains to the outdoors via a drain line. In the wet and cool condensate pan environment, conditions are favorable for the growth of microbes which can be entrained by the passing air. Depending on the operation or duty cycle of the particular system, this water sometimes remains stagnant for long time periods, thereby promoting microbial and fungal growths on water-contacted parts and surfaces.

During winter months, humidifiers are sometimes used to humidify dry air by passing the dry air across a moist surface. Systems such as pan humidifiers, portable humidifiers, power wetted-element humidifiers, atomizing humidifiers, ultrasonic humidifiers, and rigid media humidifiers are widely used. A humidifier by nature requires a water source which is evaporated into drier air. These water sources can promote microbial and fungal colony growths that could be entrained into the ventilation system via the passing air flow. Treating the water used in these systems with biocides can dramatically reduce the likelihood that airborne toxins are entrained.

The dispersion of microbes such as bacteria, virus, mold, and fungus can be the source of sickness to exposed occupants in the climate controlled area. For example, *Legionella pneumophilia* has been found to exist in such an environment and has been linked to Legionnaire's disease. Other microbes can contribute to "sick home" or "sick building" syndrome. Many people are also allergic to the molds and fungus entrained in the dwelling's ventilation as the air passes over contaminated water.

By treating the source where these microbes can be entrained by the climate control system's circulating air, these sometimes toxic airborne microbes can be much reduced or even eliminated. One way to eliminate these microbes is to treat the water contained in the water reservoir or source.

It is usually not a trivial matter to access a climate control system such as an air-conditioner air handling unit. Hence, for minimal maintenance, the treatment of the microbe-laden water in these sealed systems would best be accomplished by using an automatic time-released or long duration method. For example, one tablet or packet could reduce bacteria, fungi, algae and mold in a water reservoir for an entire summer or spring season (e.g., about 3 months or longer).

Metals such as silver (Ag), nickel (Ni), zinc (Zn), copper (Cu), and tin (Sn) are known in the art as effective biocides. For example, Ag is effective against virus and bacteria. In particular, a concentration of about 0.02 ppm (or 20 ppb) in water is effective against *Legionella pneumophilia*. Cu is also an effective algaecide and in some cases a bactericide. Other metals can also be effective against different microbes to differing degrees.

Metals such as these used as a biocide are typically provided in a water-soluble form. Hence, these materials are generally added to water systems as a water soluble salt. In order to extend the biocidal efficacy of these highly soluble salts over an extended period of time, the compounds must be metered into the water mechanically or added manually on a schedule. A better method of introducing these effective metals into the water would be a controlled dissolution. Such a controlled dissolution process would drastically reduce the manpower and equipment needed to provide the biocidal treatment.

Equally important in an aqueous biocidal metal application is the stability of those metal ions in solution. There are many anions present in water with the potential to precipitate out the metal ions, and since their availability in solution is necessary to be effective against the microbes, a way of retaining the metals in solution is highly beneficial. If provisions are not made to ensure some level of these ions in solution, they will precipitate out negating their effect against microbes, and additional materials will need to be added costing the user more in raw materials and maintenance. One known technique to ensure that these effective compounds remain in solution where they are effective against microbes is through the use of chelating agents which have a stronger affinity toward the metal ions than do the anions present in the water. Certain chelating agents such as salicylic acid (SA) are also generally known by those skilled in the art to be biocides. For example, SA is known to be an effective fungicide. Hence, the use of chelating agents such as SA along with the metal biocides will provide dissolved and stable chelated metal ions as well as a dissolved, metal free chelating agent that can also supplement the metal biocide.

SUMMARY OF THE INVENTION

One object of this invention is to provide a water treatment formulation in the form of a tablet or packet which can be placed in a air conditioner condensate water pan or de-humidifier to treat the water over an extended period of time against harmful microbes such as fungi, algae, bacteria, and virus which can be entrained by passing air.

Another object of this invention is to provide a water treatment formulation in the form of a tablet or packet which can be placed in a water reservoir, container or flow line of a humidifier to treat the water over an extended period of time against harmful microbes such as fungi, algae, bacteria, and virus which can be entrained by passing air.

Yet another object of this invention is to teach the formulations of slow dissolution tablets containing ingredients such as metal oxides and organic chelating agents which will persist in a water laden environment for 3 months or longer.

Another object of this invention is to teach the use of a long duration water treatment packet comprised of a powdered, granule, or particulate biocide and chelating agent formulation encased in a designated material.

Still another object of this invention is to teach the formulation of metal salts and chelating agents which are known in the art as slightly soluble and can be combined into a tablet form for slow dissolution and extended duration water treatment.

Furthermore, an object of this invention is to teach a formulation which can contain lesser amounts of more soluble salts in a primary water treatment formulation containing slightly soluble or insoluble salts and chelating agents with the purpose of inducing an initial "shock" of biocide metals and/or biocide chelating agents followed by an extended time period of slow-release biocide metals and chelating agents.

Another object of this invention is to teach a water treatment formulation which, when applied to water, dissolves producing metal ion concentrations below drinking water or other critical environmental standards. For example, the current EPA National Primary Drinking water Standard MCL's (Maximum Containment Levels) for copper and nickel are 1.3 ppm and 100 ppb, respectively. The current EPA National Secondary Drinking Water Standard SMCL (Suggested Maximum Containment Level) for copper, silver, and zinc are 1 ppm, 100 ppb, and 5 ppm respectively.

Furthermore, another object of this invention is to teach that a combination of metals and/or chelating agents at concentrations well-below drinking water and/or other critical environmental standards can be made extremely effective against a broad microbe spectrum present in the water of environmental control systems.

BRIEF DESCRIPTION OF THE DRAWINGS

Other objects, advantages and novel features of the present invention will become apparent from the following detailed description when considered in conjunction with the accompanying drawings herein.

DETAILED DESCRIPTION OF THE INVENTION

Figure 1:
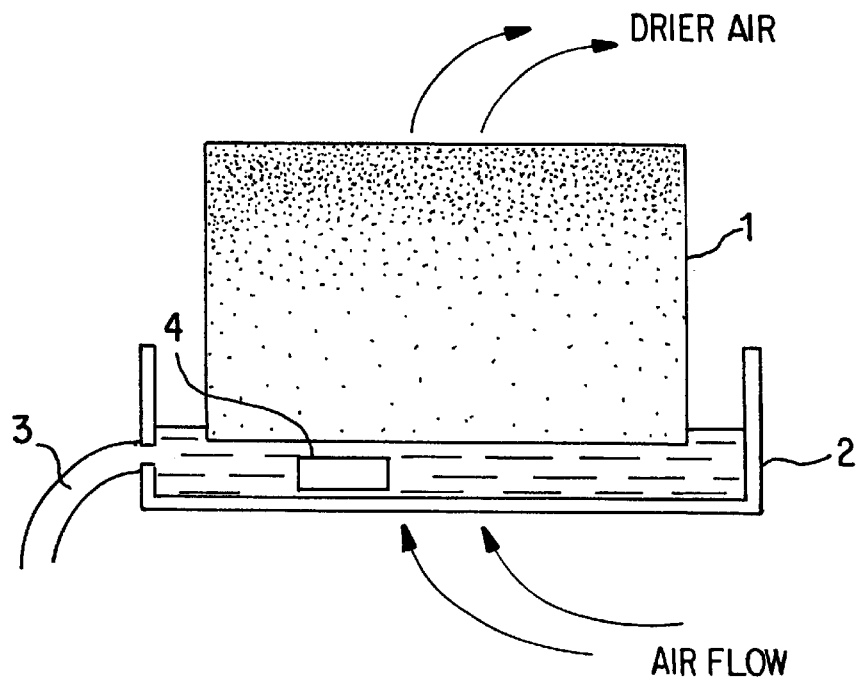
FIG. 1 is a schematic of an evaporator condensate pan and a biocide tablet of this invention.

According to a presently preferred embodiment of the present invention, a tablet or packet containing active agents, whereby the active agents are at least two metals and at least one chelating compound, is placed in the water pan or reservoir of a climate control system to provide treatment of the water over an extended time period; typically 3 months or longer. The water pan or reservoir can be the supply vessel for a humidifier or the condensate reservoir for a dehumidifier or air-conditioning system, for example.

A water treatment tablet of this invention can be formed by compressing metal salt powders along with chelating agents and any other required excipients needed for the tableting process (e.g., releasing agents, binders, lubricants, or bulk fillers). Examples of excipients used in these tablets are stearic acid, magnesium stearate, lignin sulfonate, sodium sulfonate, sugar stearate, polyethylene oxide, hydrogenated oil, polyethylene, polyvinylpyrrolidone, and graphite. In addition, surfactants may be added to enhance the tablet cleaning ability or other chemical properties. Furthermore, waxes and slightly water soluble polymers may be used to provide a structure into which the metal salts and chelating agents are dispersed and held. Typical compaction forces for the tablets are 5-7 tons, although this force can vary considerably depending on the desired dissolution rate, tablet size, and ingredients.

A water treatment formulation packet is formed by encasing powdered, granular, shot, or larger pieces of the active agents in a permeable or semi-permeable material. In tablet form, the compounds must be chosen so as to allow for a slow, controlled diffusion of the biocide chemicals into the surrounding water. If a packet is used, the compounds and packet material must be chosen so as to provide a slow controlled release of the biocide and cleaning ingredients through the packet. Note that in the case of a packet, the diffusion and dissolution rates can be affected by both the permeability of the packet material and the solubility of the chemicals enclosed. Examples of packet materials which can be sealed around the water treatment compounds include tea bag papers, silicone membranes, meltblown and spun-bonded non-woven fabrics and polymers, polycarbonates, polyvinylidenes and other polyvinyls, and polyethylenes.

There are several metals which we have found to be effective biocide agents in these slow dissolution tablet formulations. Metals such as Ag, Cu, Zn, Ni, and Sn are examples. The chemical form of these biocide metals used in the tablets is preferably an "insoluble" or sparingly soluble salt, or base metal. The term insoluble is a relative term and it is known by those skilled D in the art that there usually is still a measurable, albiet miniscule, solubility for materials described by this term. Insoluble and sparingly soluble compounds are preferred to promote slow tablet dissolution. Some of the least soluble salts of these metals are oxides (e.g., Ago, CuO, NiO, SnO, $SnO_2$) and carbonates (e.g., $Ag_2CO_3$, $ZnCO_3$), and fluorides (e.g., $CuF_2$) and chlorides. When using metal salts such as Ago and CuO, the oxides which form by the slow aqueous of dissolution and dissociation can also provide additional biocidal effectiveness against certain microbes. Other slightly soluble salts useful in this invention are nickel phosphate, zinc laurate, zinc phosphate, zinc stearate, silver chloride, copper(I) chloride, tributyltin oxide, tributyltin chloride, tin oxalate, and tin fluoride. Powders, small pieces of sheet, or shots of the metals themselves, Ag, Ni, Cu, Zn, and Sn, could also be used for slow dissolution.

The chelating agents which we have found to be effective in these tablet formulations are generally aminopolycarboxylics such as salicylic acid (SA), ethylenediaminetetraacetic acid (EDTA), nitrilotriacetic acid (NTA), and diethylenetriamine pentaacetic acid (DTPA), and metal salts of these compounds which can decrease their solubility in water. A slight solubility in water is preferred to promote slow tablet dissolution. Other chelating agents and their metal salts having a slight or negligible aqueous solubility would be equally effective and useful in this invention.

The biocide metal and chelating agents may also be provided as a complex salt rather than individual components in combination with, or instead of, the individual slightly soluble metal salts and chelating agents. For example, Cu citrate, Ag tartrate, and/or Sn tartrate may be used as a component in the tablets. More soluble salts may also be used in the formulation to provide an initial high concentration of metal ions and chelating agents. Although these more soluble salts are not the primary component on this invention, they can serve to "shock" the water with higher biocide concentrations shortly after a tablet or packet containing material is added to the contaminated water. The other slow dissolution compounds in the tablet then provide the longer lasting biocide effect. Examples of more soluble metal salts which we have found useful for this purpose are copper sulfate, zinc sulfate, copper acetate, copper(II) chloride, copper nitrate, silver nitrate, silver sulfate, silver phosphate, silver fluoride, silver acetate, nickel nitrate, nickel sulfate, zinc acetate, zinc chloride, zinc gluconate, zinc nitrate, zinc salicylate, zinc sulfate, and tin sulfate. More readily soluble chelating agents could also be used along with these more readily soluble metal salts. Examples are sodium and potassium conjugate base salts of weak acid chelating agents such as SA, EDTA, NTA, and DPTA.

It is also a currently preferred embodiment of this invention to use a combination of two or more metals with one or more chelating agents in the tablet. Because metals have differing biocidal effectiveness against bacteria, virus, fungi, and algae, it is therefore advantageous to use a combination which will provide a broad scope of biocidal activity. In addition, it is advantageous to use two or more chelating agents because different metals have different solution equilibrium constants with the chelating agents and by providing two or more chelating agents, we can better maximize the solution concentration of all metal ions.

Excipients such as magnesium stearate, stearic acid, sugar stearate, sodium sulfonate, and lignin sulfonate can also be used to aid the tablet compaction process. These compounds are also generally surfactants, which can serve to clean surfaces within the water system, container or pan.

Figure 2:
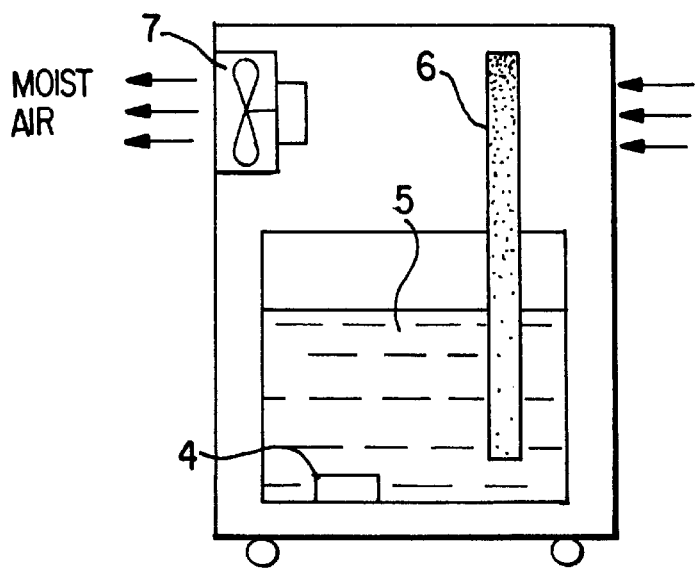
FIG. 2 is a schematic of a humidifier and a biocide tablet of this invention.

Referring to the drawing figures, FIG. 1 is a typical cooling surface 1 by which humid air passes generating a condensate in pan 2 which drains by line 3. A tablet or packet 4 can be placed in the pan to produce compounds which are effective in treating microbes present in the pan 2, FIG. 2 is a schematic of a appliance portable humidifier with water treatment tablet or packet 4 in water reservoir 5. Dry air blows across a wetted media 6 by fan 7.

EXAMPLE 1

A formulation of 70% EDTA, 23% SA, 6.5% CuO, and 0.5% AgO was formed into 6 g tablets. The tablets were placed in a pan of water with a flow of 75 milliliters per minute to simulate the condensate flow rate from a 3 ton residential air conditioner evaporator coil. The tablet had a life of about 4 months. The average concentrations of Ag and Cu in the water were 7 and 72 ppb, respectively.

EXAMPLE 2

A packet containing 0.9 grams of salicylic acid, 17 mg Ago, and 0.4 g cuo was placed in a static pan inoculated with high levels of A/C pan bacteria. Inside the packet, glass beads or another inert compound can also be added to decrease packet buoyancy. After six days, the pan was examined for growth and fungus and relative to the positive control, the pan containing the packet was observed to have much less fungal and bacterial growth in it. The final concentration of Ag and Cu in the solution was 75 and 53 ppb, respectively. These can be compared to the EPA's MCL and SMCL values 5 of 100 ppb and 1000 ppb, respectively.

EXAMPLE 3

A tablet weighing 1.599 grams and composed of EDTA, CuO and Ago was placed into a static pan and inoculated with high levels of A/C pan bacteria. After three days, the pan was examined for bacterial growth by using a plate count method whereby 2 ml of sample was mixed with standard plate count agar and examined for growth a day later. For this tablet, less than 10 colonies were observed compared to the positive control which had colonies that were too numerous to count (TNTC).

EXAMPLE 4

A tablet weighing 1.178 grams and composed of salicylic acid, CuO, and Ago was placed into a static pan and inoculated with high levels of A/C pan bacteria. After twenty days, the pan was examined for bacterial growth by using a plate count method whereby 2 ml of sample was mixed with standard plate count agar and examined for growth a day later. For this tablet, less than 10 colonies were observed compared to the positive control which had colonies that were TNTC.

EXAMPLE 5

A tablet weighing 1.359 grams and composed of wax binder, release agent, salicylic acid, CuO and Ago was placed into a static pan and inoculated with high levels of A/C pan bacteria. After twenty days, the pan was examined for bacterial growth by using a plate count method whereby 2 ml of sample was mixed with standard plate count agar and examined for growth a day later. For this tablet, less than 10 colonies were observed compared to the positive control, which had colonies that were TNTC.

EXAMPLE 6

A tablet weighing 1.423 grams and composed of wax binder salicylic acid, release agent, CuO, and Ago was placed into a static pan and inoculated with high levels of A/C pan bacteria. After twenty days, the pan was examined for bacterial growth by using a plate count method whereby 2 ml of sample was mixed with standard plate count agar and examined for growth a day later. For this tablet, less than 10 colonies were observed compared to the positive control which had colonies that were TNTC.

EXAMPLE 7

A tablet weighing 1.229 grams and composed of wax binder salicylic acid, CuO, and Ago was placed into a static pan and inoculated with high levels of A/C pan bacteria. After twenty days, the pan was examined for bacterial growth by using a plate count method whereby 2 ml of sample was mixed with standard plate count agar and examined for growth a day later. For this tablet, less than 10 colonies were observed compared to the positive control which had colonies that were TNTC.

EXAMPLE 8

A tablet weighing 4.289 grams and composed of salicylic acid (~25%) and ethylenediaminetetraacetic acid (EDTA) (~75%) and smaller amounts of CuO and AgO was placed into a static pan and inoculated with high levels of A/C pan bacteria. After six days the pan was examined for bacterial growth by using a plate count method whereby 2 ml of sample was mixed with standard plate growth agar and examined for growth a day later. For this tablet, no colonies were observed compared to the positive control which had colonies that were TNTC.

EXAMPLE 9

A tablet weighing 5.163 grams and composed of salicylic acid (~25%) and ethylenediaminetetraacetic acid (EDTA) (~75%) and smaller amounts of CuO and AgO was placed into an actual A/C pan. After 15 days, a sample was removed from the A/C unit for bacteria analysis. Two groups of tests were performed. The first type was quantitative and consisted of a standard plate count whereby colonies are incubated and counted. The second test was the biological activity reaction tests (BART) which is a quantitative but descriptive at identifying bacteria types. Two BART tests were conducted and included the Iron Related Bacteria (IRB) and the Slime Producing Bacteria (SLB). Results, as compared to the A/C pan before a tablet was introduced, indicated a drop in the plate count from 142,000 to 806 colonies per ml and the BART test for SLB required 16 days to induce growth rather than the original 3 days without the tablet. The BART test for IRB, however, did not change significantly.

EXAMPLE 10

A tablet weighing 5.254 grams and composed of salicylic acid (~25%) and ethylenediaminetetraacetic acid (EDTA)

(~75%) and smaller amounts of CuO, AgO, and dodecyl sulfate was placed into an actual A/C pan. After 15 days, a sample was removed from the A/C unit for bacteria analysis. Two groups of tests were performed. The first type was quantitative and consisted of a standard plate count whereby colonies are incubated and counted. The second test was the biological activity reaction tests (BART) which is a quantitative but descriptive at identifying bacteria types. Two BART tests were conducted and included the Iron Related Bacteria (IRB) and the Slime Producing Bacteria (SLB). Results, as compared to the A/C pan before a tablet was introduced, indicated a drop in the plate count from 196990 colonies per ml to 0 colonies per ml. The BART test for IRB initially required eight days to see results but with the tablet present in the A/C pan, the time increased to greater than 20 days. The SLM test was negative all throughout the test period.

EXAMPLE 11

Formulations similar to that of example 10 were produced except that either NTA or DTPA were used in place of EDTA. Similar results to that of example 10 were measured.

EXAMPLE 12

A formulation comprised of about 20% SA, 70% EDTA, 6% CuO, 0.5% Ag), and 3.5% $CuSO_4$ was produced into tablets of about 7 grams. These tablets were placed into a pan of about 1 liter of water and compared colorwise to a tablet of similar composition without the $CuSO_4$. The water of the CuSO4-containing tablet turned color more quickly and more blue than the other tablet indicating a "shock" or more rapid dissolution of the soluble CuSO4 component into the water.

EXAMPLE 13

A formulation of about 22% SA, 66% EDTA, 0.5% AgO, 6.5% CuO, 4% stearic acid, and 1% magnesium stearate was compressed into a tablet having a weight of 9.5 grams. This particular tablet was compressed with about 7 tons. The hardness of the tablet as measured per BEC method M705.2 was 23.6 kiloponds dry, and then 19.8 kiloponds after being submerged in water for 24 hrs. The retention of hardness after being submersed in water was found to be a good indication of good dissolution qualities in condensate or other water treatment pans. This tablet was submersed in a water pan with a water hold up of about 1 liter and a continuous flow rate of fresh water for about 9 hours per day at about 75 milliliters per minute. The dissolution rate of the tablet was measured to be about 0.1 grams per 8.5 hour day (i.e., equivalent to an air conditioner running 8.5 hrs per day or a 35% duty cycle). This equated to about 3.6 milligrams of tablet per liter of condensate water treated. At this flow rate, the average concentration of Ag and Cu in the treated water is 14 ppb and 0.14 ppm, respectively. These concentrations can be compared to the EPA's MCL and SMCL values of 100 ppb and 1 ppm, respectively. This particular tablet under these conditions will last for approximately 114 days.

EXAMPLE 14

A tablet identical to that of Example 13 was submersed in a pan as in Example 13 but with a water flow rate of about 20 milliliters per minute. The dissolution rate of the tablet was approximately the same as that for the higher flow rate which would be indicative of a system for which the tablet dissolution process is controlled by the solubility of the chemicals and not convection or hydrodynamics in the pan. At this flow rate and the dissolution rate measured, the concentrations if Ag and Cu on average were 47 ppb and 0.5 ppm, respectively. These concentrations can be compared to the EPA's MCL and SMCL values of 100 ppb and 1 ppm, respectively. This particular tablet under these conditions will last for approximately 126 days.

EXAMPLE 15

A tablet identical to that of Example 13 was submersed in a pan as in Example 13 but the water changeover was only 1 liter per week. The dissolution rate of the tablet was much slower than that in examples 13 and 14 at about 0.06 grams per 8.5 hour day. At this water changeover rate, the concentrations if Ag and Cu on average were 2.8 ppm and 30 ppm, respectively. This particular tablet under these conditions will last for approximately 289 days.

Figure 3:
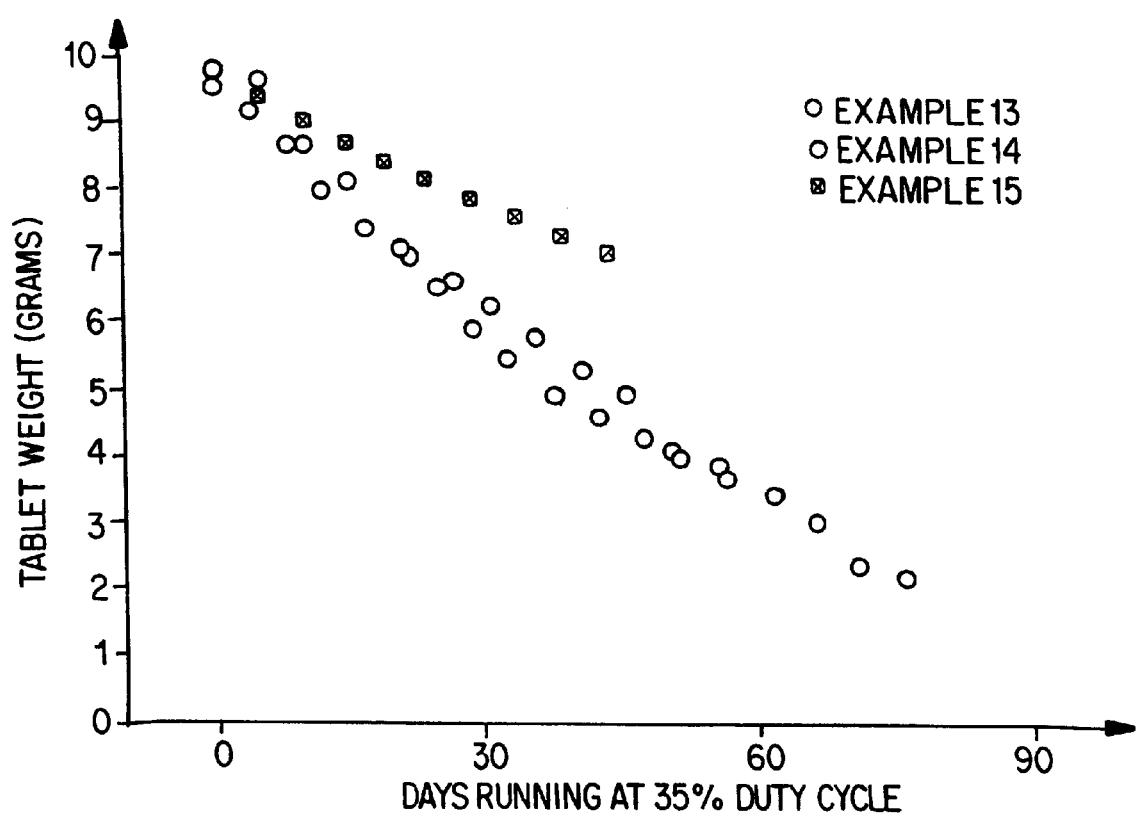
FIG. 3 is a graph of a tablet weight change with time for biocide tablet described in Examples 13, 14, and 15.

FIG. 3 is a graph showing the change in mass per day for the tablet formulations of examples 13, 14, and 15.

EXAMPLE 16

A container was connected to the condensate drip line from a 3 ton and a 5 ton residential air conditioning unit. A packet containing 34 mg AgO, 0.8 g CuO, and 5.4 g SA was placed inside the containers. The water flow rates varied between about 20 and 150 ml/min. The concentrations of Ag and Cu in the flowing condensate water was measured to be less than 16 ppb and 0.1–0.6 ppm, respectively. These concentrations can be compared to the EPA's MCL and SMCL values of 100 ppb and 1 ppm, respectively.

EXAMPLE 17

Fifteen milligrams of bare Ag metal, 0.32 g of bare Cu metal, and 0.9 g of SA were placed inside a spunbonded packet and heat sealed. The final concentrations of the Ag and Cu in 1.2 liters of water were 100 ppb and 0.3 ppm, respectively.

EXAMPLE 18

Fifteen milligrams of bare Ag metal, 1.4 g of bare Zn metal, and 0.9 g of SA were placed inside a spunbonded packet and heat sealed. The final concentrations of the Ag and Zn in 1.2 liters of water were 150 ppb and 11 ppm, respectively.

EXAMPLE 19

Fifteen milligrams of bare Ag metal, 1.4 g of bare Zn metal, and 1.8 g of EDTA were placed inside a spunbonded packet and heat sealed. The final concentrations of the Ag and Zn in 1.2 liters of water were 65 ppb and 28 ppm, respectively.

EXAMPLE 20

Fifteen milligrams of bare Ag metal, 4.4 g Zn citrate, and 39 mg of EDTA were placed inside a spunbonded packet and heat sealed. The final concentrations of the Ag and Zn in 1.2 liters of water were 12 ppb and 283 ppm, respectively.

While the invention has been described in connection with currently preferred embodiments, procedures, and examples, it is to be understood that such detailed description was not intended to limit the invention on the described embodiments, procedures, and examples. Instead, it is the intent of the present invention to cover all alternatives, modifications, and equivalent which may be included within the spirit and scope of the invention as defined by the claims hereto.

What is claimed is:

1. A method for treating water, comprising:
   producing a formulation comprising at least two biocide metals and at least one chelating agent, wherein said formulation dissolves over a period of months or longer; and
   applying the formulation to the water to be treated.

2. The method of claim 1, wherein the at least two biocide metals are independently selected from the group consisting of Ag, Cu, Ni, Sn and Zn.

3. The method of claim 2, wherein at least one biocide metal comprises Ag selected from the group consisting of $Ag_2CO_3$, Ago, Ag metal, and AgCl.

4. The method of claim 2, wherein at least one biocide metal comprises Cu selected from the group consisting of CuO, Cu(I)Cl, $CuF_2$, and Cu metal.

5. The method of claim 2, wherein at least one biocide metal comprises Ni selected from the group consisting of $Ni_3PO_4$, NiO, and Ni metal.

6. The method of claim 2, at least one biocide metal comprises Zn selected from the group consisting of $ZnCO_3$, Zn laurate, $Zn_3(PO_4)_2$, Zn stearate and Zn metal.

7. The method of claim 2, wherein at least one biocide metal comprises Sn selected from the group consisting of SnO, $SnO_2$, tributyltin oxide, tributyltin chloride, tin oxalate, tin fluoride, and Sn metal.

8. The method of claim 1, wherein the at least one chelating agent is selected from the group consisting of salicylic acid, ethylenediaminetetraacetic acid, nitrilotriacetic acid, and diethylenetriamine pentaacetic acid.

9. The method of claim 1, wherein the at least one chelating agent is an aminopolycarboxylic compound.

10. The method of claim 1, wherein the at least one chelating agent is a metal salt of an aminopolycarboxylic acid.

11. The method of claim 1, wherein the water to be treated is present in a climate control system which is one of an air conditioner, a heat pump, a humidifier, and a de-humidifier.

12. The method of claim 1, wherein the at least one chelating agent is a biocide metal salt.

13. The method of claim 1, wherein at least one of the at least two biocide metals is a salt of a chelating agent.

14. The method of claim 1 wherein the formulation is produced by being pressed into a tablet form.

15. The method of claim 1, wherein the formulation is produced by being encased in a packet.

16. The method of claim 1, further comprising adding at least one water soluble metal salt and at least one water soluble chelating agent to the formulation, wherein the at least one water soluble metal salt and the at least one water soluble chelating agent are more soluble in water than the at least two biocide metals and the at least one chelating agent.

17. The method of claim 1, wherein the formulation dissolves and treats the water over a period of about 3 months or longer.

18. The method of claim 1, further comprising dispersing and holding the at least two biocide metals and at least one chelating agent into a wax or slightly soluble polymer.

19. The method of claim 1, wherein the formulation dissolves and treats the water over a period of at least 114 days.

20. The method of claim 1, wherein the formulation dissolves and treats the water over a period of at least 4 months.

21. The method of claim 1, wherein the formulation dissolves and treats the water over a period of at least 289 days.

22. A method for treating water, comprising:
    producing a formulation comprising at least two biocide metals in a form that is soluble in water and at least one chelating agent, wherein said formulation dissolves over a period of months or longer; and
    applying the formulation to water to be treated in a climate control system which is one of an air conditioner, a heat pump, a humidifier, or a de-humidifier.

23. A method for treating water, comprising:
    producing a formulation comprising AgO, CuO, salicylic acid, ethylenediaminetetraacetic acid, and other excipients; and
    applying the formulation to water to be treated in a climate control system which is one of an air conditioner, a heat pump, a humidifier, or a de-humidifier.

24. A method for treating water, comprising:
    producing a formulation comprising at least two biocide metals and at least one chelating agent, wherein said formulation is slightly soluble in water; and
    applying the formulation to the water to be treated.

* * * * *